(12) United States Patent
Jordan et al.

(10) Patent No.: US 10,890,692 B2
(45) Date of Patent: Jan. 12, 2021

(54) OPTIONALLY TRANSFERABLE OPTICAL SYSTEM WITH A REDUCED THICKNESS

(75) Inventors: Gregory R. Jordan, Cumming, GA (US); Samuel M. Cape, Woodstock, GA (US); Scott K. Palm, Milton, GA (US); Jonathan D. Gosnell, Cumming, GA (US); Caroline B. Kennedy, Winter Springs, FL (US)

(73) Assignee: Visual Physics, LLC, Alpharetta, GA (US)

( * ) Notice: Subject to any disclaimer, the term of this patent is extended or adjusted under 35 U.S.C. 154(b) by 257 days.

(21) Appl. No.: 14/239,314

(22) PCT Filed: Aug. 17, 2012

(86) PCT No.: PCT/US2012/051394
§ 371 (c)(1),
(2), (4) Date: May 2, 2014

(87) PCT Pub. No.: WO2013/028534
PCT Pub. Date: Feb. 28, 2013

(65) Prior Publication Data
US 2014/0376091 A1    Dec. 25, 2014

Related U.S. Application Data

(60) Provisional application No. 61/525,239, filed on Aug. 19, 2011.

(51) Int. Cl.
*G02B 27/10* (2006.01)
*G03B 21/60* (2014.01)
(Continued)

(52) U.S. Cl.
CPC ...... *G02B 3/0006* (2013.01); *B29D 11/00278* (2013.01); *G02B 3/0031* (2013.01);
(Continued)

(58) Field of Classification Search
CPC .............. G02B 3/0006; G02B 27/4205; G02B 3/0031; G02B 5/09; G02B 27/2214;
(Continued)

(56) References Cited

U.S. PATENT DOCUMENTS 992,151 A    5/1911    Berthon
1,824,353 A    9/1931    Jensen
(Continued)

FOREIGN PATENT DOCUMENTS

AU    2009278275    7/2012
CA    2741298    4/2010
(Continued)

OTHER PUBLICATIONS

Drinkwater, K. John, et al., "Development and applications of Diffractive Optical Security Devices for Banknotes and High Value Documents", Optical Security and Counterfeit Deterrence Techniques III, 2000, pp. 66-79, SPIE vol. 3973, San Jose, CA.
(Continued)

*Primary Examiner* — Mahidere S Sahle

(57) ABSTRACT

An optionally transferable optical system with a reduced thickness is provided. The inventive optical system is basically made up of a synthetic image presentation system in which one or more arrangements of structured image icons are substantially in contact with, but not completely embedded within, one or more arrangements of focusing elements. The focusing element and image icon arrangements cooperate to form at least one synthetic image. By way of the subject invention, the requirement for an optical spacer to provide the necessary focal distance between the focusing elements and their associated image icon(s) is removed. As a result, overall system thicknesses are reduced, suitability as a surface-applied authentication system is enabled, and tamper resistance is improved.

34 Claims, 4 Drawing Sheets

(51) Int. Cl.
*G02B 3/00* (2006.01)
*B29D 11/00* (2006.01)
*G02B 30/27* (2020.01)
*G02B 5/09* (2006.01)
*G02B 27/42* (2006.01)

(52) U.S. Cl.
CPC ........... *G02B 5/09* (2013.01); *G02B 27/4205* (2013.01); *G02B 30/27* (2020.01)

(58) Field of Classification Search
CPC .... G02B 3/0056; G02B 3/0068; G02B 3/005; G02B 3/0062; G02B 3/0037; G02B 27/2292; G02B 27/0961; G02B 27/22; B29D 11/00278; B42D 2035/20
USPC ........ 359/567, 292, 599, 455, 463, 619–628
See application file for complete search history.

(56) References Cited

U.S. PATENT DOCUMENTS

| | | |
|---|---|---|
| 1,849,036 A | 3/1932 | Ernst |
| 1,942,841 A | 1/1934 | Shimizu |
| 2,268,351 A | 12/1941 | Tanaka |
| 2,355,902 A | 8/1944 | Berg |
| 2,432,896 A | 12/1947 | Hotchner |
| 2,888,855 A | 6/1959 | Tanaka |
| 2,992,103 A | 7/1961 | Land et al. |
| 3,122,853 A | 3/1964 | Koonz |
| 3,241,429 A | 3/1966 | Rice et al. |
| 3,264,164 A | 8/1966 | Jerothe |
| 3,312,006 A | 4/1967 | Rowland |
| 3,357,772 A | 12/1967 | Rowland |
| 3,357,773 A | 12/1967 | Rowland |
| 3,463,581 A | 8/1969 | Clay |
| 3,609,035 A | 9/1971 | Ataka |
| 3,643,361 A | 11/1972 | Eaves |
| 3,704,068 A | 11/1972 | Waly |
| 3,801,183 A | 4/1974 | Sevelin et al. |
| 3,811,213 A | 5/1974 | Eaves |
| 3,887,742 A | 6/1975 | Reinnagel |
| 4,025,673 A | 5/1977 | Reinnagel |
| 4,073,650 A | 2/1978 | Yevick |
| 4,082,426 A | 4/1978 | Brown |
| 4,185,191 A | 1/1980 | Stauffer |
| 4,345,833 A | 8/1982 | Siegmund |
| 4,417,784 A | 11/1983 | Knop et al. |
| 4,498,736 A | 2/1985 | Griffin |
| 4,507,349 A | 3/1985 | Fromson et al. |
| 4,519,632 A | 5/1985 | Parkinson et al. |
| 4,534,398 A | 8/1985 | Crane |
| 4,634,220 A | 1/1987 | Hockert et al. |
| 4,645,301 A | 2/1987 | Orensteen et al. |
| 4,662,651 A | 5/1987 | Mowry, Jr. |
| 4,688,894 A | 8/1987 | Hockert |
| 4,691,993 A | 9/1987 | Porter et al. |
| 4,756,972 A | 7/1988 | Kloosterboer et al. |
| 4,765,656 A | 8/1988 | Becker et al. |
| 4,814,594 A | 3/1989 | Drexler |
| 4,892,336 A | 1/1990 | Kaule et al. |
| 4,892,385 A | 1/1990 | Webster, Jr. et al. |
| 4,920,039 A | 4/1990 | Fotland et al. |
| 4,935,335 A | 6/1990 | Fotland |
| 4,988,126 A | 1/1991 | Heckenkamp et al. |
| 5,044,707 A | 9/1991 | Mallik |
| 5,074,649 A | 12/1991 | Hamanaka |
| 5,085,514 A | 2/1992 | Mallik et al. |
| 5,135,262 A | 8/1992 | Smith et al. |
| 5,142,383 A | 8/1992 | Mallik |
| 5,211,424 A | 5/1993 | Bliss |
| 5,215,864 A | 6/1993 | Laakmann |
| 5,232,764 A | 8/1993 | Oshima |
| 5,254,390 A | 10/1993 | Lu |
| 5,282,650 A | 2/1994 | Smith et al. |
| 5,359,454 A | 10/1994 | Steenblik et al. |
| 5,384,861 A | 1/1995 | Mattson et al. |
| 5,393,099 A | 2/1995 | D'Amato |
| 5,393,590 A | 2/1995 | Caspari |
| 5,413,839 A | 5/1995 | Chatwin et al. |
| 5,433,807 A | 7/1995 | Heckenkamp et al. |
| 5,438,928 A | 8/1995 | Chatwin et al. |
| 5,449,200 A | 9/1995 | Andric et al. |
| 5,460,679 A | 10/1995 | Abdel-Kader |
| 5,461,495 A | 10/1995 | Steenblik et al. |
| 5,464,690 A | 11/1995 | Boswell |
| 5,468,540 A | 11/1995 | Lu |
| 5,479,507 A | 12/1995 | Anderson |
| 5,492,370 A | 2/1996 | Chatwin et al. |
| 5,503,902 A | 4/1996 | Steenblik et al. |
| 5,538,753 A | 7/1996 | Antes et al. |
| 5,543,942 A | 8/1996 | Mizuguchi et al. |
| 5,555,476 A | 9/1996 | Suzuki et al. |
| 5,567,276 A | 10/1996 | Boehm et al. |
| 5,568,313 A | 10/1996 | Steenblik et al. |
| 5,574,083 A | 11/1996 | Brown et al. |
| 5,575,507 A | 11/1996 | Yamauchi et al. |
| 5,598,281 A | 1/1997 | Zimmerman et al. |
| 5,623,347 A | 4/1997 | Pizzanelli |
| 5,623,368 A | 4/1997 | Calderini et al. |
| 5,626,969 A | 5/1997 | Joson |
| 5,631,039 A | 5/1997 | Knight et al. |
| 5,639,126 A | 6/1997 | Dames et al. |
| 5,642,226 A | 6/1997 | Rosenthal |
| 5,643,678 A | 7/1997 | Boswell |
| 5,670,003 A | 9/1997 | Boswell |
| 5,670,096 A | 9/1997 | Lu |
| 5,674,580 A | 10/1997 | Boswell |
| 5,688,587 A | 11/1997 | Burchard et al. |
| 5,695,346 A | 12/1997 | Sekiguchi et al. |
| 5,712,731 A | 1/1998 | Drinkwater et al. |
| 5,723,200 A | 3/1998 | Oshima |
| 5,731,064 A | 3/1998 | Süss |
| 5,737,126 A | 4/1998 | Lawandy |
| 5,753,349 A | 5/1998 | Boswell |
| 5,759,683 A | 6/1998 | Boswell |
| 5,763,349 A | 6/1998 | Zandona |
| 5,783,017 A | 7/1998 | Boswell |
| 5,783,275 A | 7/1998 | Mück et al. |
| 5,800,907 A | 9/1998 | Yumoto |
| 5,810,957 A | 9/1998 | Boswell |
| 5,812,313 A | 9/1998 | Johansen |
| 5,886,798 A | 3/1999 | Staub et al. |
| 5,933,276 A | 8/1999 | Magee |
| 5,949,420 A | 9/1999 | Terlutter |
| 5,995,638 A | 11/1999 | Amidror |
| 6,030,691 A | 2/2000 | Burchard et al. |
| 6,036,230 A | 3/2000 | Fárber |
| 6,036,233 A | 3/2000 | Braun et al. |
| 6,060,143 A | 5/2000 | Tompkin |
| 6,084,713 A | 7/2000 | Rosenthal |
| 6,089,614 A | 7/2000 | Howland et al. |
| 6,106,950 A | 8/2000 | Searle et al. |
| 6,176,582 B1 * | 1/2001 | Grasnick ............. G02B 3/0043 353/7 |
| 6,177,953 B1 | 1/2001 | Vachette et al. |
| 6,179,338 B1 | 1/2001 | Bergmann et al. |
| 6,195,150 B1 | 2/2001 | Silverbrook |
| 6,249,588 B1 | 6/2001 | Amidror et al. |
| 6,256,149 B1 | 7/2001 | Rolfe |
| 6,256,150 B1 | 7/2001 | Rosenthal |
| 6,283,509 B1 | 9/2001 | Braun et al. |
| 6,288,842 B1 | 9/2001 | Florczak et al. |
| 6,297,911 B1 | 10/2001 | Nishikawa et al. |
| 6,301,363 B1 | 10/2001 | Mowry, Jr. |
| 6,302,989 B1 | 10/2001 | Kaule |
| 6,328,342 B1 | 12/2001 | Belousov et al. |
| 6,329,040 B1 | 12/2001 | Oshima et al. |
| 6,329,987 B1 | 12/2001 | Gottfried et al. |
| 6,345,104 B1 | 2/2002 | Rhoads |
| 6,348,999 B1 | 2/2002 | Summersgill et al. |
| 6,350,036 B1 | 2/2002 | Hannington et al. |
| 6,369,947 B1 | 4/2002 | Staub et al. |
| 6,373,965 B1 | 4/2002 | Liang |
| 6,381,071 B1 | 4/2002 | Dona et al. |

(56) References Cited

U.S. PATENT DOCUMENTS

| | | |
|---|---|---|
| 6,404,555 B1 | 6/2002 | Nishikawa |
| 6,405,464 B1 | 6/2002 | Gulick, Jr. et al. |
| 6,414,794 B1 | 7/2002 | Rosenthal |
| 6,424,467 B1 | 7/2002 | Goggins |
| 6,433,844 B2 | 8/2002 | Li |
| 6,450,540 B1 | 9/2002 | Kim |
| 6,467,810 B2 | 10/2002 | Taylor et al. |
| 6,473,238 B1 | 10/2002 | Daniell |
| 6,483,644 B1 | 11/2002 | Gottfried et al. |
| 6,500,526 B1 | 12/2002 | Hannington |
| 6,521,324 B1 | 2/2003 | Debe et al. |
| 6,542,646 B1 | 4/2003 | Bar-Yona |
| 6,558,009 B2 | 5/2003 | Hannington et al. |
| 6,587,276 B2 | 7/2003 | Daniell |
| 6,616,803 B1 | 9/2003 | Isherwood et al. |
| 6,618,201 B2 | 9/2003 | Nishikawa et al. |
| 6,641,270 B2 | 11/2003 | Hannington et al. |
| 6,671,095 B2 | 12/2003 | Summersgill et al. |
| 6,712,399 B1 | 3/2004 | Drinkwater et al. |
| 6,721,101 B2 | 4/2004 | Daniell |
| 6,724,536 B2 | 4/2004 | Magee |
| 6,726,858 B2 | 4/2004 | Andrews |
| 6,751,024 B1 | 6/2004 | Rosenthal |
| 6,761,377 B2 | 7/2004 | Taylor et al. |
| 6,795,250 B2 | 9/2004 | Johnson et al. |
| 6,803,088 B2 | 10/2004 | Kaminsky et al. |
| 6,819,775 B2 | 11/2004 | Amidror et al. |
| 6,833,960 B1 | 12/2004 | Scarbrough et al. |
| 6,856,462 B1 | 2/2005 | Scarbrough et al. |
| 6,935,756 B2 | 8/2005 | Sewall et al. |
| 6,870,681 B1 | 11/2005 | Magee |
| 6,900,944 B2 | 11/2005 | Tomczyk |
| 7,030,997 B2 | 4/2006 | Neureuther et al. |
| 7,058,202 B2 | 6/2006 | Amidror |
| 7,068,434 B2 | 6/2006 | Florczak et al. |
| 7,114,750 B1 | 10/2006 | Alasia et al. |
| 7,194,105 B2 | 3/2007 | Hersch et al. |
| 7,246,824 B2 | 7/2007 | Hudson |
| 7,254,265 B2 | 8/2007 | Naske et al. |
| 7,255,911 B2 | 8/2007 | Lutz et al. |
| 7,288,320 B2 | 10/2007 | Steenblik et al. |
| 7,333,268 B2 | 2/2008 | Steenblik et al. |
| 7,336,422 B2 | 2/2008 | Dunn et al. |
| 7,372,631 B2 | 5/2008 | Ozawa |
| 7,389,939 B2 | 6/2008 | Jones et al. |
| 7,422,781 B2 | 9/2008 | Gosselin |
| 7,457,038 B2 | 11/2008 | Dolgoff |
| 7,457,039 B2 | 11/2008 | Raymond et al. |
| 7,468,842 B2 | 12/2008 | Steenblik et al. |
| 7,504,147 B2 | 3/2009 | Hannington |
| 7,545,567 B2 | 6/2009 | Tomczyk |
| 7,609,450 B2 | 10/2009 | Niemuth |
| 7,630,954 B2 | 12/2009 | Adamczyk et al. |
| 7,686,187 B2 | 3/2010 | Pottish et al. |
| 7,712,623 B2 | 5/2010 | Wentz et al. |
| 7,719,733 B2 | 5/2010 | Schilling et al. |
| 7,738,175 B2 | 6/2010 | Steenblik et al. |
| 7,751,608 B2 | 7/2010 | Hersch et al. |
| 7,762,591 B2 | 7/2010 | Schilling et al. |
| 7,763,179 B2 | 7/2010 | Levy et al. |
| 7,812,935 B2 | 10/2010 | Cowburn et al. |
| 7,820,269 B2 | 10/2010 | Staub et al. |
| 7,830,627 B2* | 11/2010 | Commander .......... B41M 3/148 359/820 |
| 7,849,993 B2 | 12/2010 | Finkenzeller et al. |
| 8,027,093 B2 | 9/2011 | Commander et al. |
| 8,057,980 B2 | 11/2011 | Dunn et al. |
| 8,111,463 B2 | 2/2012 | Endle et al. |
| 8,149,511 B2 | 4/2012 | Kaule et al. |
| 8,241,732 B2 | 8/2012 | Hansen et al. |
| 8,284,492 B2 | 10/2012 | Crane et al. |
| 8,514,492 B2 | 8/2013 | Schilling et al. |
| 8,528,941 B2 | 9/2013 | Dörfler et al. |
| 8,537,470 B2 | 9/2013 | Endle et al. |
| 8,557,369 B2 | 10/2013 | Hoffmüller et al. |
| 8,693,101 B2 | 4/2014 | Tomczyk et al. |
| 8,867,134 B2 | 10/2014 | Steenblik et al. |
| 8,908,276 B2 | 12/2014 | Holmes |
| 2001/0048968 A1 | 12/2001 | Cox et al. |
| 2002/0014967 A1 | 2/2002 | Crane et al. |
| 2002/0114078 A1 | 8/2002 | Halle et al. |
| 2002/0185857 A1 | 12/2002 | Taylor et al. |
| 2003/0031861 A1 | 2/2003 | Reiter et al. |
| 2003/0112523 A1 | 6/2003 | Daniell |
| 2003/0137740 A1* | 7/2003 | Hannington ............ G02B 5/021 359/614 |
| 2003/0157211 A1 | 8/2003 | Tsunetomo et al. |
| 2003/0179364 A1 | 9/2003 | Steenblik et al. |
| 2003/0183695 A1 | 10/2003 | Labrec et al. |
| 2003/0228014 A1 | 12/2003 | Alasia et al. |
| 2003/0232179 A1 | 12/2003 | Steenblik et al. |
| 2003/0234294 A1 | 12/2003 | Uchihiro et al. |
| 2004/0020086 A1 | 2/2004 | Hudson |
| 2004/0022967 A1 | 2/2004 | Lutz et al. |
| 2004/0065743 A1 | 4/2004 | Doublet |
| 2004/0100707 A1 | 5/2004 | Kay et al. |
| 2004/0140665 A1 | 7/2004 | Scarbrough et al. |
| 2004/0209049 A1 | 10/2004 | Bak |
| 2005/0094274 A1 | 5/2005 | Souparis |
| 2005/0104364 A1 | 5/2005 | Keller et al. |
| 2005/0161501 A1 | 7/2005 | Giering et al. |
| 2005/0180020 A1 | 8/2005 | Steenblik et al. |
| 2005/0247794 A1 | 11/2005 | Jones et al. |
| 2006/0003295 A1 | 1/2006 | Hersch et al. |
| 2006/0011449 A1 | 1/2006 | Knoll |
| 2006/0017979 A1 | 1/2006 | Goggins |
| 2006/0018021 A1 | 1/2006 | Tomkins et al. |
| 2006/0061267 A1 | 3/2006 | Yamasaki et al. |
| 2006/0227427 A1 | 10/2006 | Dolgoff |
| 2007/0058260 A1 | 3/2007 | Steenblik et al. |
| 2007/0092680 A1 | 4/2007 | Chaffins et al. |
| 2007/0164555 A1 | 7/2007 | Mang et al. |
| 2007/0183045 A1 | 8/2007 | Shilling et al. |
| 2007/0183047 A1 | 8/2007 | Phillips et al. |
| 2007/0273143 A1 | 11/2007 | Crane et al. |
| 2007/0284546 A1 | 12/2007 | Ryzi et al. |
| 2007/0291362 A1 | 12/2007 | Hill et al. |
| 2008/0080058 A1* | 4/2008 | Raymond .......... G02B 27/2214 359/627 |
| 2008/0130018 A1 | 6/2008 | Steenblik et al. |
| 2008/0143095 A1 | 6/2008 | Isherwood et al. |
| 2008/0160226 A1 | 7/2008 | Kaule et al. |
| 2008/0182084 A1 | 7/2008 | Tompkin et al. |
| 2009/0008923 A1* | 1/2009 | Kaule .................. B42D 25/342 283/67 |
| 2009/0061159 A1 | 3/2009 | Staub et al. |
| 2009/0243278 A1 | 10/2009 | Camus et al. |
| 2009/0290221 A1 | 11/2009 | Hansen et al. |
| 2009/0310470 A1 | 12/2009 | Yrjonen |
| 2009/0315316 A1 | 12/2009 | Staub et al. |
| 2010/0001508 A1 | 1/2010 | Tompkin et al. |
| 2010/0018644 A1 | 1/2010 | Sacks et al. |
| 2010/0045024 A1 | 2/2010 | Attner et al. |
| 2010/0068459 A1 | 3/2010 | Wang et al. |
| 2010/0084851 A1 | 4/2010 | Schilling |
| 2010/0103527 A1* | 4/2010 | Endle ........................ B44F 7/00 359/620 |
| 2010/0109317 A1 | 5/2010 | Huffmuller et al. |
| 2010/0177094 A1 | 7/2010 | Kaule et al. |
| 2010/0182221 A1 | 7/2010 | Kaule et al. |
| 2010/0194532 A1 | 8/2010 | Kaule |
| 2010/0208036 A1 | 8/2010 | Kaule |
| 2010/0308571 A1 | 12/2010 | Steenblik et al. |
| 2010/0328922 A1 | 12/2010 | Peters et al. |
| 2011/0017498 A1 | 1/2011 | Lauffer et al. |
| 2011/0019283 A1 | 1/2011 | Steenblik et al. |
| 2011/0056638 A1 | 3/2011 | Rosset |
| 2011/0179631 A1 | 7/2011 | Gates et al. |
| 2012/0019607 A1 | 1/2012 | Dunn et al. |
| 2012/0033305 A1 | 2/2012 | Moon et al. |
| 2012/0091703 A1 | 4/2012 | Maguire et al. |
| 2012/0098249 A1 | 4/2012 | Rahm et al. |
| 2012/0105928 A1 | 5/2012 | Camus et al. |
| 2012/0194916 A1 | 8/2012 | Cape et al. |

(56) References Cited

U.S. PATENT DOCUMENTS

| | | |
|---|---|---|
| 2012/0243744 A1 | 9/2012 | Camus et al. |
| 2013/0003354 A1* | 1/2013 | Meis .................... G02B 3/0006 362/97.1 |
| 2013/0010048 A1 | 1/2013 | Dunn et al. |
| 2013/0038942 A1 | 2/2013 | Holmes |
| 2013/0044362 A1 | 2/2013 | Commander et al. |
| 2013/0154250 A1 | 6/2013 | Dunn et al. |
| 2014/0174306 A1 | 6/2014 | Wening et al. |
| 2014/0175785 A1 | 6/2014 | Kaule et al. |
| 2014/0353959 A1 | 12/2014 | Lochbihler |
| 2014/0367957 A1 | 12/2014 | Jordan |
| 2016/0176221 A1 | 6/2016 | Holmes |
| 2016/0257159 A1 | 9/2016 | Attner et al. |

FOREIGN PATENT DOCUMENTS

| | | |
|---|---|---|
| CN | 1102865 | 5/1995 |
| CN | 1126970 | 11/2003 |
| CN | 1950570 | 4/2007 |
| CN | 101678664 | 3/2010 |
| DE | 19804858 | 8/1999 |
| DE | 19932240 | 1/2001 |
| DE | 10100692 | 8/2004 |
| EP | 0090130 | 10/1983 |
| EP | 0092691 | 11/1983 |
| EP | 0118222 | 9/1984 |
| EP | 0156460 | 10/1985 |
| EP | 0203752 | 12/1986 |
| EP | 0253089 | 1/1988 |
| EP | 0318717 | 6/1989 |
| EP | 0415230 | 3/1991 |
| EP | 0319157 | 7/1992 |
| EP | 0801324 | 10/1997 |
| EP | 0887699 | 12/1998 |
| EP | 0930174 | 7/1999 |
| EP | 0997750 | 5/2000 |
| EP | 1356952 | 10/2003 |
| EP | 1002640 | 5/2004 |
| EP | 1354925 | 4/2006 |
| EP | 1659449 | 5/2006 |
| EP | 1743778 | 1/2007 |
| EP | 1876028 | 1/2008 |
| EP | 1897700 | 3/2008 |
| EP | 1931827 | 1/2009 |
| EP | 2335937 | 6/2011 |
| EP | 2338682 | 6/2011 |
| EP | 2162294 | 3/2012 |
| FR | 2803939 | 7/2001 |
| FR | 2952194 | 5/2011 |
| GB | 1095286 | 12/1967 |
| GB | 2103669 | 2/1983 |
| GB | 2362493 | 11/2001 |
| GB | 2395724 | 6/2004 |
| GB | 2433470 | 6/2007 |
| GB | 2490780 | 11/2012 |
| JP | 41-004953 | 3/1966 |
| JP | 46-022600 | 8/1971 |
| JP | 04-234699 | 8/1992 |
| JP | H05-508119 | 11/1993 |
| JP | 10-035083 | 2/1998 |
| JP | 10-039108 | 2/1998 |
| JP | 11-501590 | 2/1999 |
| JP | 11-189000 | 7/1999 |
| JP | 2000-056103 | 2/2000 |
| JP | 2000-233563 | 8/2000 |
| JP | 2000-256994 | 9/2000 |
| JP | 2001-055000 | 2/2001 |
| JP | 2001-516899 | 10/2001 |
| JP | 2001-324949 | 11/2001 |
| JP | 2003-039583 | 2/2003 |
| JP | 2003-165289 | 6/2003 |
| JP | 2003-528349 | 9/2003 |
| JP | 2003-326876 | 11/2003 |
| JP | 2004-262144 | 9/2004 |
| JP | 2004-317636 | 11/2004 |
| JP | 2005-193501 | 7/2005 |
| JP | 2007-514188 A | 5/2007 |
| JP | 2009-012319 A | 1/2009 |
| JP | 2009-262375 A | 11/2009 |
| JP | 2009-274293 | 11/2009 |
| JP | 2011-502811 | 1/2011 |
| KR | 10-0194536 | 6/1999 |
| KR | 2002170350000 | 3/2001 |
| KR | 2003119050000 | 5/2003 |
| KR | 1005443000000 | 1/2006 |
| KR | 1005613210000 | 3/2006 |
| RU | 2111125 | 5/1998 |
| RU | 2245566 | 1/2005 |
| RU | 2010101854 | 7/2011 |
| TW | 575740 | 2/2004 |
| WO | WO 1992/008998 | 5/1992 |
| WO | WO 1992/019994 | 11/1992 |
| WO | WO 1993/024332 | 12/1993 |
| WO | WO 1996/035971 | 11/1996 |
| WO | WO 1997/019820 | 6/1997 |
| WO | WO 1997/044769 | 11/1997 |
| WO | WO 1998/013211 | 4/1998 |
| WO | WO 1998/015418 | 4/1998 |
| WO | WO 1999/014725 | 3/1999 |
| WO | WO 1999/023513 | 5/1999 |
| WO | WO 1998/026373 | 6/1999 |
| WO | WO 1999/026793 | 6/1999 |
| WO | WO 1999/066356 | 12/1999 |
| WO | WO 2001/007268 | 2/2001 |
| WO | WO 2001/011591 | 2/2001 |
| WO | WO 2001/039138 | 5/2001 |
| WO | WO 2001/053113 | 7/2001 |
| WO | WO 2001/063341 | 8/2001 |
| WO | WO 2001/071410 | 9/2001 |
| WO | WO 2002/040291 | 5/2002 |
| WO | WO 2002/043012 | 5/2002 |
| WO | WO 2002/101669 | 12/2002 |
| WO | WO 2003/005075 | 1/2003 |
| WO | WO 2003/007276 | 1/2003 |
| WO | WO 2003/022598 | 3/2003 |
| WO | WO 2003/053713 | 7/2003 |
| WO | WO 2003/061980 | 7/2003 |
| WO | WO 2003/061983 | 7/2003 |
| WO | WO 2003/082598 | 10/2003 |
| WO | WO 2003/098188 | 11/2003 |
| WO | WO 2004/022355 | 3/2004 |
| WO | WO 2004/036507 | 4/2004 |
| WO | WO 2004/087430 | 10/2004 |
| WO | 2005052650 A2 | 6/2005 |
| WO | WO 2005/106601 | 11/2005 |
| WO | WO 2006/029744 | 3/2006 |
| WO | WO 2007/133613 | 3/2006 |
| WO | WO 2007/076952 | 7/2007 |
| WO | WO 2009/000527 | 12/2008 |
| WO | WO 2009/000528 | 12/2008 |
| WO | WO 2009/000529 | 12/2008 |
| WO | WO 2009/000530 | 12/2008 |
| WO | WO 2009/121784 | 10/2009 |
| WO | WO 2010/015383 | 2/2010 |
| WO | WO 2010/094691 | 8/2010 |
| WO | 2010/113114 A2 | 10/2010 |
| WO | WO 2010/136339 | 12/2010 |
| WO | WO 2011/015384 | 2/2011 |
| WO | WO 2011/019912 | 2/2011 |
| WO | WO 2011/044704 | 4/2011 |
| WO | WO 2011/051669 | 5/2011 |
| WO | WO 2011/107793 | 9/2011 |
| WO | WO 2011/122943 | 10/2011 |
| WO | WO 2012/027779 | 3/2012 |
| WO | WO 2012/103441 | 8/2012 |
| WO | WO 2013/028534 | 2/2013 |

(56) References Cited

FOREIGN PATENT DOCUMENTS

| WO | WO 2013/093848 | 6/2013 |
|---|---|---|
| WO | WO 2013/098513 | 7/2013 |

OTHER PUBLICATIONS

Fletcher, D.A., et al., "Near-field infrared imaging with a microfabricated solid immersion lens", Applied Physics Letters, Oct. 2, 2000, pp. 2109-2111, vol. 77, No. 14.
Gale, M. T., et al., Chapter 6—Replication, Micro Optics: Elements, Systems and Applications, 1997, pp. 153-177.
Hardwick, Bruce and Ghioghiu Ana, "Guardian Substrate as an Optical Medium for Security Devices", Optical Security and Counterfeit Deterrence Techniques III, 2000, pp. 176-179, SPIE vol. 3973, San Jose, CA.
Hutley, M.C., et al., "The Moiré Magnifier", Pure Appl. Opt. 3, 1994, pp. 133-142, IOP Publishing Ltd., UK.
Hutley, M.C., "Integral Photography, Superlenses and the Moiré Magnifier", European Optical Society, 1993, pp. 72-75, vol. 2, UK.
Hutley, M., et al., "Microlens Arrays", Physics World, Jul. 1991, pp. 27-32.
Kamal, H., et al., "Properties of Moiré Magnifiers", Opt. Eng., Nov. 1998, pp. 3007-3014, vol. 37, No. 11.
Leech, Patrick W., et al., Printing via hot embossing of optically variable images in thermoplastic acrylic lacquer, Microelectronic Engineering, 2006, pp. 1961-1965, vol. 83, No. 10, Elsevier Publishers BV, Amsterdam, NL.
Lippmann, G., "Photgraphie—Épreuves Réversibles, Photographies Intégrals", Académie des Sciences, 1908, pp. 446-451, vol. 146, Paris.
Liu, S., et al., "Artistic Effects and Application of Moiré Patterns in Security Holograms", Applied Optics, Aug. 1995, pp. 4700-4702, vol. 34, No. 22.
Phillips, Roger W., et al., Security Enhancement of Holograms with Interference Coatings, Optical Security and Counterfeit Deterrence Techniques III, 2000, pp. 304-316, SPIE vol. 3973, San Jose, CA.
Steenblik, Richard A., et al., UNISON Micro-optic Security Film, Optical Security and Counterfeit Deterrence Techniques V, 2004, pp. 321-327, SPIE vol. 5310, San Jose, CA.
Van Renesse, Rudolf L., Optical Document Security, 1994, Artech House Inc., Norwood, MA.
Van Renesse, Rudolf L., Optical Document Security, 1998, 2nd edition, pp. 232-235, 240-241 and 320-321, Artech House Inc., Norwood, MA (ISBN 0-89006-982-4).
Van Renesse, Rudolf L., Optical Document Security, 2005, 3rd edition, pp. 62-169, Artech House Inc., Norwood, MA (ISBN 1-58053-258-6).
Wolpert, Gary R., Design and development of an effective optical variable device based security system incorporating additional synergistic security technologies, Optical Security and Counterfeit Deterrence Techniques III, 2000, pp. 55-61, SPIE vol. 3973, San Jose, CA.
Zhang, X., et al., "Concealed Holographic Coding for Security Applications by Using a Moiré Technique", Applied Optics, Nov. 1997, pp. 8096-8097, vol. 36, No. 31.
Amidror, "A Generalized Fourier-Based Method for the Analysis of 2D Moiré Envelope-Forms in Screen Superpositions", Journal of Modern Optics (London, GB), vol. 41, No. 9, Sep. 1, 1994, pp. 1837-1862, ISSN: 0950-0340.
Article: "Spherical Lenses" (Jan. 18, 2009); pp. 1-12; retrieved from the Internet: URL: http://www.physicsinsights.org/simple_optics_spherical_lenses-1.html.
Dunn, et al., "Three-Dimensional Virtual Images for Security Applications", Optical Security and Counterfeit Deterrence Techniques V, (published Jun. 3, 2004), Proc. SPIE 5310.
Muke, "Embossing of Optical Document Security Devices", Optical Security and Counterfeit Deterrence Techniques V, (published Jun. 3, 2004), Proc. SPIE 5310.
Office Action dated Aug. 21, 2018 in connection with Japanese Patent Application No. 2014-527203, 6 pages.
European Patent Office, "Communication pursuant to Article 94(3) EPC," Application No. EP 17176980.5, dated Aug. 26, 2019, 6 pages.
IMPI—Mexican Institute Industrial Property, "Notification of 1st in-depth requirement," Application No. MX/a/2014/001926, dated Jun. 11, 2019, 6 pages.
Notice of Reasons for Rejection in connection with Japanese Application No. 2018-239264 dated Jan. 7, 2020, 4 pages.
Egyptian Patent Office, "Notification of Office Action," Egyptian Application No. D1PCT233/2014, dated Oct. 7, 2019, 10 pages.
Brazil National Institute of Industrial Property (INPI), "Report and Search Report," Application No. BR112014003888-0, dated Dec. 26, 2019, 4 pages.
Canadian Intellectual Property Office, Notification in connection with Application No. CA 2,845,610 dated Mar. 22, 2019, 3 pages.
Summons to attend oral proceedings pursuant to Rule 115(1) EPC in connection with European Application No. 17176980.5 dated Jun. 25, 2020, 8 pages.
Decision of Refusal in connection with Japanese Application No. 2018-239264 dated Apr. 28, 2020, 4 pages.

* cited by examiner

OPTIONALLY TRANSFERABLE OPTICAL SYSTEM WITH A REDUCED THICKNESS

RELATED APPLICATION

This application claims priority to U.S. Provisional Patent Application Ser. No. 61/525,239, filed Aug. 19, 2011, which is incorporated herein in its entirety by reference.

TECHNICAL FIELD

The present invention generally relates to an improved system for presenting one or more synthetic images, and more particularly relates to an optionally transferable optical system with a reduced thickness.

BACKGROUND AND SUMMARY OF THE INVENTION

As described in detail in, for example, U.S. Pat. No. 7,333,268 to Steenblik et al., the focal length of focusing elements in micro-optic materials determines the optical separation of the focusing elements from an image icon array. In other words, the arrays in these micro-optic materials are positioned on either side of an optical spacer so as to align the focal point of each focusing element with its associated image icon(s). When the focal point lies on or within the image icon array, the synthetic image is in sharp focus. When, however, the focal point lies above or below the image icon array, the synthetic image is blurry and out of focus.

By way of the present invention, the requirement for an optical spacer (i.e., a flexible transparent polymeric film-like material) to provide the necessary focal distance between the focusing elements and their associated image icon(s) is removed. As a result, overall system thicknesses are reduced, suitability as a surface-applied authentication system is enabled, and tamper resistance is improved.

More specifically, the present invention provides an optionally transferable optical system with a reduced thickness, which basically comprises a synthetic image presentation system made up of one or more arrangements of structured image icons substantially in contact with, but not completely embedded within, one or more arrangements of focusing elements, wherein the one or more arrangements of image icons and the one or more arrangements of focusing elements cooperate to form at least one synthetic image of at least a portion of the image icons, wherein interstitial space between focusing elements in the one or more arrangements of focusing elements does not contribute to the formation of the at least one synthetic image.

The phrase "substantially in contact", as used herein, is intended to mean that either the top or bottom (e.g., apex or base) of the focusing elements is substantially in contact with or touches the image icons.

Focusing elements contemplated for use in the present invention include refractive, reflective (e.g., concave reflective, convex reflective), hybrid refractive/reflective, and diffractive focusing elements. Examples of such focusing elements are described in U.S. Pat. No. 7,333,268 to Steenblik et al., U.S. Pat. No. 7,468,842 to Steenblik et al., and U.S. Pat. No. 7,738,175 to Steenblik et al., which are fully incorporated herein by reference as if fully set forth herein. Interstitial space between focusing elements in the arrangements used in inventive micro-scale systems is typically about 5 microns or less for systems with a total thickness of less than about 50 microns, while interstitial space in inventive macro-scale systems is typically greater in size, preferably about 5 millimeters or less for systems with a total thickness of less than or equal to 1 centimeter. It is noted that reflective focusing elements reflect incident light and may be metalized to obtain high focusing efficiency. For metallization, the profiles of the lens structures of the concave reflective or convex reflective arrangements may be provided with a reflecting metal layer (e.g., a vapor deposited metal layer). Instead of a fully opaque reflecting metal layer, a semitransparent (or partially metalized) metal layer, or a high refractive index layer can be provided. Furthermore, multiple layers of vapor deposited material may be used to provide reflectivity, for example, color-shifting interference coatings formed from dielectric layers, or from a combination of metal and dielectric layers such as metal/dielectric/metal may also provide the necessary reflectivity.

Image icons contemplated for use in the present invention are structured image icons (i.e., image icons having a physical relief). In one exemplary embodiment, the image icons are optionally coated and/or filled voids or recesses (e.g., voids in a substantially planar structure, the voids optionally filled or coated with another material), while in another exemplary embodiment, the image icons are formed from raised areas or shaped posts (e.g., raised areas in a substantially planar structure). Examples of structured image icons are also described in U.S. Pat. No. 7,333,268 to Steenblik et al., U.S. Pat. No. 7,468,842 to Steenblik et al., and U.S. Pat. No. 7,738,175 to Steenblik et al.

Unexpectedly and quite surprisingly, the present inventors have discovered that tailoring the focal length of the focusing elements in the inventive system serves to obviate the need for an optical spacer. It was found that the arrangement(s) of image icons may intersect the depth of focus of the arrangement(s) of focusing elements without the need for an optical spacer, resulting in a thinner, more streamlined system capable of presenting at least one synthetic image. Moreover, and as will be explained in more detail below, the present inventors have also discovered that when certain focusing element designs are used, it is possible to transfer the inventive system to a value document or product without a base film or carrier substrate forming any part of the transferred system. Both discoveries have resulted in a synthetic image presentation system having a decrease in cross-sectional thickness, a suitability as a surface-applied security feature, and a reduced risk of interlayer delamination.

Other benefits realized by the subject invention include increased tamper resistance and projected images with improved contrast and clarity. As will be readily appreciated, optical systems lacking a tough optical spacer between the focusing elements and image icons are more difficult to remove intact from a final substrate once bonded. Moreover, the closer the focusing elements are to the image icons, the greater the contrast and clarity of the projected images. Without the additional thickness imposed by an optical spacer film (typically a biaxially-oriented optical spacer film) between focusing elements and image icons, there is less light scattering and birefringence. This results in images that appear sharper and have greater contrast.

As alluded to above, various system size ranges are contemplated by the present invention. In addition to micro-scale systems, macro-scale systems are also contemplated. Such larger scale systems may constitute unitary or complete film structures, or may be formed with replaceable image icon arrangements.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

The present disclosure may be better understood with reference to the following drawings. Components in the drawings are not necessarily to scale, emphasis instead being placed upon clearly illustrating the principles of the present disclosure.

Particular features of the disclosed invention are illustrated by reference to the accompanying drawings which are cross-sectional side views of the following exemplary embodiments of the present invention.

DETAILED DESCRIPTION OF THE INVENTION

Exemplary embodiments of the inventive system will now be disclosed in connection with the drawings. There is no intent, however, to limit the present disclosure to the embodiments disclosed herein. On the contrary, the intent is to cover all alternatives, modifications and equivalents. For example, additional features or functionality, such as those described in U.S. Pat. No. 7,333,268 to Steenblik et al., U.S. Pat. No. 7,468,842 to Steenblik et al., and U.S. Pat. No. 7,738,175 to Steenblik et al., may also be included in the invention system. Such additional features or functionality may comprise textured surfaces for better adhesion to further layers, adhesion promoters, etc. The inventive system may also contain overt or covert information such as customized or personalized information in the form of serial numbers, bar codes, images, etc. that can be formed using traditional printing techniques or laser engraving systems. This added functionality would allow interaction between the synthetic images and the covert information. Additionally, information can be overprinted or printed on various layers at all stages of manufacture, or post manufacture.

Refractive System Embodiments

Figure 1:
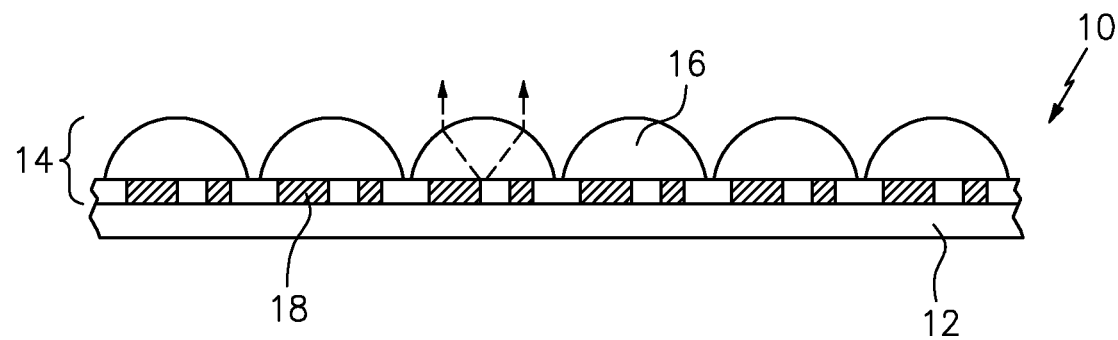
FIG. 1—refractive optical system.

In a first exemplary embodiment, which is best shown in FIG. 1, the inventive system is a refractive optical system 10 that further includes a support or carrier substrate 12. In this embodiment, a synthetic image presentation system 14 is built on one side of the carrier substrate 12. As will be readily appreciated, the carrier substrate 12 does not contribute to the optical functionality of the system. In other words, synthetic images will be presented regardless of the presence or opacity of the carrier substrate 12.

The synthetic image presentation system 14 in this first exemplary embodiment employs refractive focusing elements 16, which each have a focal length such that a structured image icon 18 placed substantially in contact or close to its base intersects with a portion of its depth of focus, when viewed normal to the surface. Generally, these focusing elements have very low f-numbers (e.g., less than or equal to 1) and cylindrical, spheric or aspheric surfaces.

The term "f-number", as used herein, is intended to mean the ratio of a focusing element's focal length (real or virtual in the case of convex reflectors) to its effective lens diameter.

The synthetic image presentation system 14 may be cast against the carrier substrate 12. The materials forming carrier substrate 12 can be selected from plastics, cellulose, composites, polyamide (e.g., nylon 6), polycarbonate, polyester, polyethylene, polyethylene napthalate (PEN), polyethylene terephthalate (PET), polypropylene, polyvinylidene chloride films or sheets, mylar sheets, cellophane, paper, rag/cotton, combinations thereof, and the like.

The arrangements of structured image icons and focusing elements of the synthetic image presentation system 14 may be formed from a variety of materials such as substantially transparent or clear, colored or colorless polymers such as acrylics, acrylated polyesters, acrylated urethanes, epoxies, polycarbonates, polypropylenes, polyesters, urethanes, and the like, using methods such as extrusion (e.g., extrusion embossing, soft embossing), radiation cured casting, and injection molding, reaction injection molding, and reaction casting. High refractive index, colored or colorless materials having refractive indices (at 589 nanometers, 20° C.) of more than 1.5, 1.6, 1.7, or higher, such as those described in U.S. Patent Application Publication No. US 2010/0109317 A1 to Hoffmuller et al., may also be used in the practice of the present invention.

An exemplary method of manufacture is to form the icons as voids in a radiation cured liquid polymer (e.g., acrylated urethane) that is cast from an icon mold against a base film (i.e., carrier substrate 12), such as 75 gauge adhesion-promoted PET film, then to fill the icon voids with a submicron particle pigmented coloring material by gravure-like doctor blading against the polymeric icon surface, then to solidify the fill by suitable means (e.g., solvent removal, radiation curing, or chemical reaction), then to cast lenses against the filled icons by bringing the icon side of the base film against a lens mold filled with radiation curable polymer, and solidifying the polymer by application of ultraviolet (UV) light or other actinic radiation.

For micro-scale systems used, for example, in the form of a security strip, thread, patch, or overlay:
  (a) the focusing elements have preferred widths (in the case of cylindrical focusing elements) and base diameters (in the case of non-cylindrical focusing elements) of less than about 50 microns (more preferably, less than about 25 microns, and most preferably, from about 5 to about 15 microns), preferred focal lengths of less than about 50 microns (more preferably, less than about 25 microns, and most preferably, from about 1 to about 5 microns), and preferred f-numbers of less than or equal to 1 (more preferably, less than or equal to 0.75);
  (b) the structured image icons are either optionally coated and/or filled voids or recesses each preferably measuring from about 50 nanometers to about 8 microns in total depth, or raised areas or shaped posts each preferably measuring from about 50 nanometers to about 8 microns in total height;
  (c) the carrier substrate has a preferred thickness ranging from about 10 to about 50 microns, more preferably, from about 15 to about 25 microns; and
  (d) the total thickness of the inventive system is preferably less than about 50 microns (more preferably, less than about 45 microns, and most preferably, from about 10 to about 40 microns).

Figure 2:
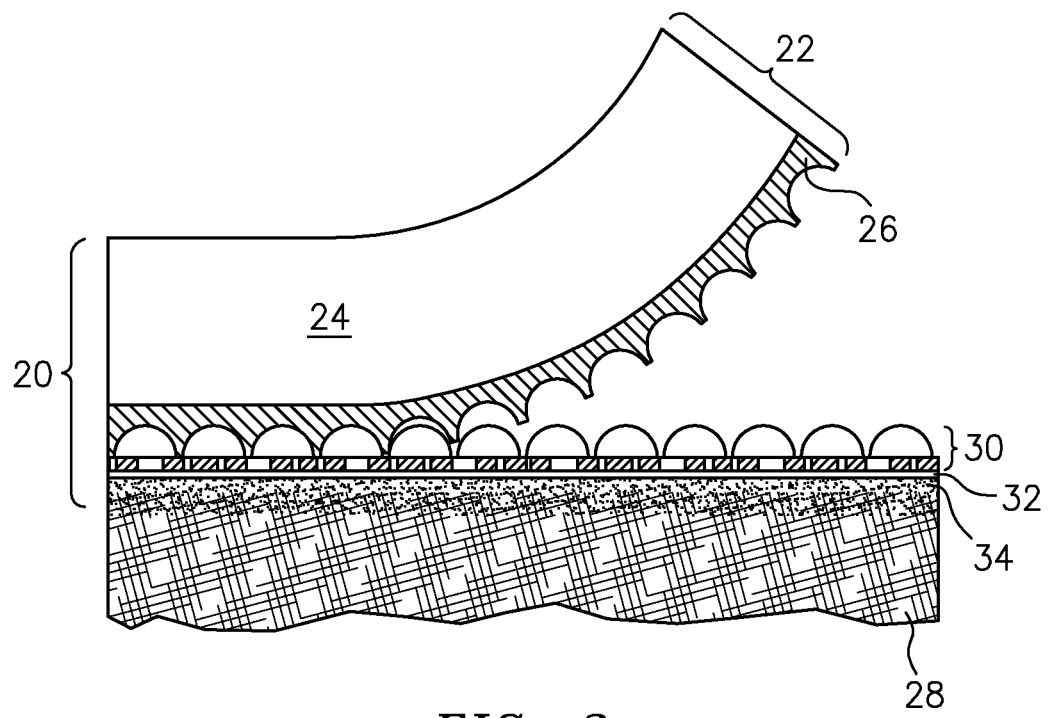
FIG. 2—transferable refractive optical system.

In a second exemplary embodiment, which is best shown in FIG. 2, the inventive system is a transferable refractive optical system 20 that further includes a microstructure-bearing release liner 22, which is made up of carrier substrate 24 and "lens mold" layer 26. FIG. 2 shows the system 20 during application to a paper substrate 28. The refractive optical system 20 (with one or more adhesive layers) may be transferred to another surface as a transfer film using techniques including mechanical, chemical, thermal and photo-induced separation techniques. The concept of separation of desired components from a carrier substrate is known in the art of holographic foil transfer, whereby a film with a release coating (i.e., release liner) is provided with optical coatings and adhesives, such that the optical coatings and adhesives can be transferred to a final substrate with application of heat and pressure. This embodiment is particularly useful in applications requiring films with very thin cross-sectional thicknesses.

By way of the present exemplary embodiment, the inventors made the surprising discovery that synthetic image presenting optics may in fact be successfully separated from a carrier film. As will be readily appreciated by those skilled in the art, the crest and trough geometry of focusing elements described herein means that the optical structure will be more resistant to release from a carrier film, as compared to smoother films or foils (e.g., holograms), which have lower surface areas and lower aspect ratios of microstructured features, making them easier to separate from a carrier film. Moreover, incorrect separation operations cause non-uniform stresses to be applied to the system being transferred, negatively impacting upon the ability of these systems to project synthetic images. The synthetic image presenting optics of the present invention rely on the focusing of light within the volume of the transferred structure and applied stress may cause distortions in the volume of the structure. By utilizing the techniques and optical structures described herein, these difficulties are overcome.

Referring again to FIG. 2, synthetic image presentation system 30 is shown releasably coupled to the release liner 22 by way of "lens mold" layer 26. The "lens mold" layer 26 is typically a curable resin (e.g., polyester acrylate) layer between 3 and 50 microns in thickness, while the carrier substrate 24 is typically a 15 to 50 micron UV transmissive film (e.g., a PET film).

An optional stiffening layer 32 is shown on the arrangement of structured image icons of the synthetic image presentation system 30. Process performance is enhanced by making system 30 have a higher stiffness or resistance to bending than the carrier substrate 24 and "lens mold" layer 26. The stiffening layer 32 may be prepared from energy curable acrylates and has a preferred thickness between 1 and 10 microns. In addition to, or instead of, stiffening layer 32, one or more sealing layers may be applied to the arrangement of structured image icons. Such a sealing layer may be prepared from energy curable acrylates (e.g., energy curable acrylates containing organic or inorganic fillers with pigmenting or reinforcing properties), solvent or water based coatings such as acrylics, epoxies, ethylene-vinyl acetates (EVAs), polyurethanes, polyvinyl alcohols (PVAs), and the like, and may have a thickness between 1 and 10 microns.

Adhesive layer 34 is shown on the stiffened system 30 in FIG. 2. Adhesive layer 34 may be prepared from thermally activated adhesives (i.e., hot melt or heat seal adhesives), pressure sensitive adhesives, or any thermoset or thermoplastic adhesive system selected to provide bonding between these target surfaces including acrylics, cyanoacrylates, epoxies, polyimides, polyurethanes, polyvinyl acetates, rubber, and silicones. Adhesive layer 34 is preferably prepared from a tack free thermally activated adhesive, and has a preferred thickness between 1 and 100 microns. Common activation temperatures for thermally activated adhesives may range from about 70 to about 170° C., while for pressure activated adhesives, no additional heat is required to activate the adhesive.

Figure 2A:
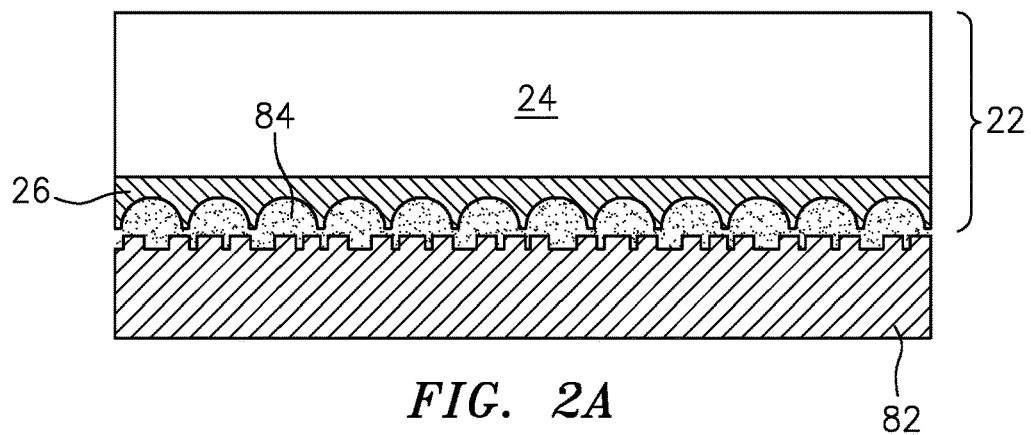
FIG. 2A—transferable refractive optical system of FIG. 2 during formation thereof onto the "lens mold" layer of the microstructure-bearing release liner, where in a first step, the "lens mold" layer is placed against a rigid icon mold while an optically functional UV curable liquid polymer fills the plurality of voids of both the "lens mold" layer and the rigid icon mold.
Figure 2B:
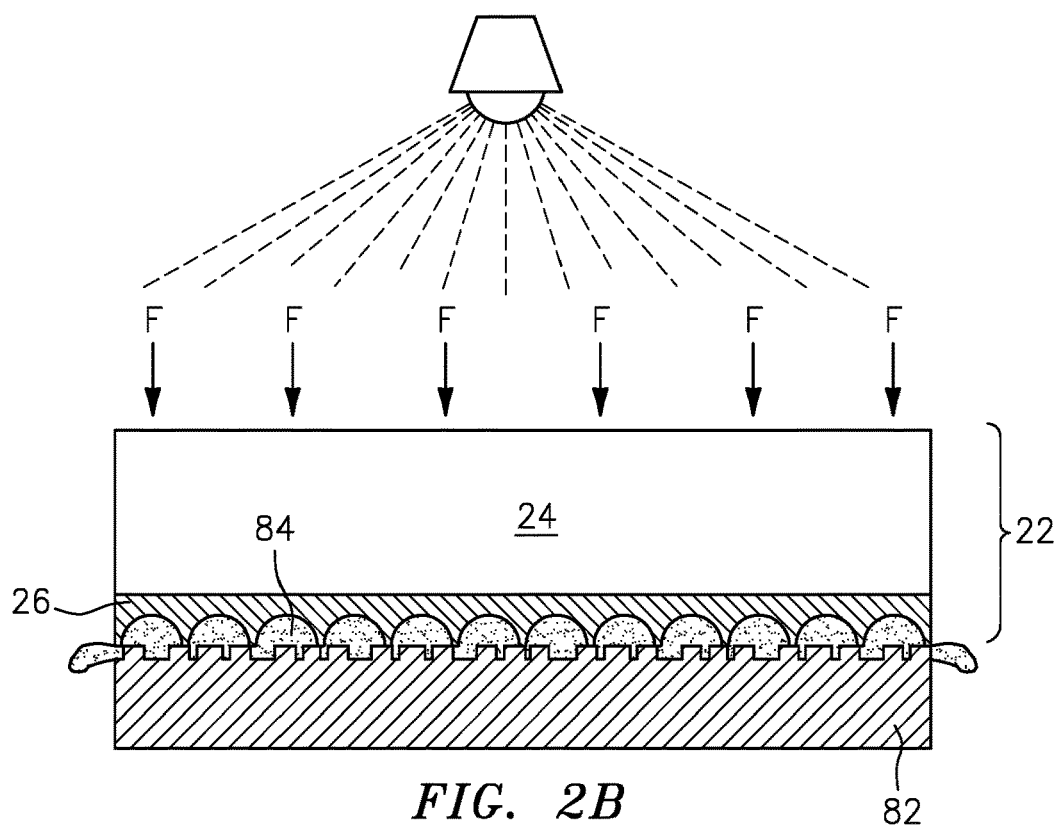
FIG. 2B—transferable refractive optical system of FIG. 2 during formation thereof, where in a second step, pressure is applied to exclude excess liquid polymer, while the liquid polymer is exposed to UV radiation such that the UV curable polymer cures or hardens and can be lifted from the icon mold.
Figure 2C:
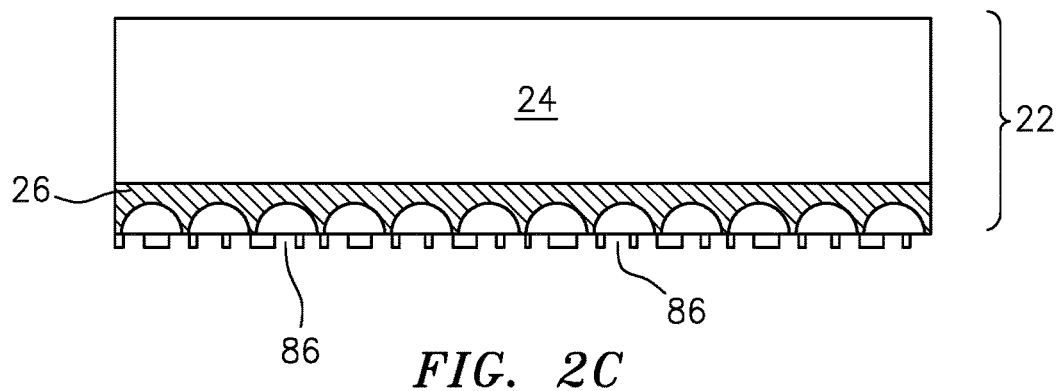
FIG. 2C—transferable refractive optical system of FIG. 2 during formation thereof, after the cured polymer has been removed from the rigid icon mold.

An exemplary method of manufacturing the transferable refractive optical system of the present invention comprises:
  forming a microstructure-bearing release liner comprising a "lens mold" layer adhered to a carrier film (e.g., a UV transmissive carrier film), wherein the "lens mold" layer is formed from a curable resin having a plurality of voids with negative lens geometries, the negative lens geometries being made by UV curing the resin against a rigid surface having positive lens geometries (i.e., a positive lens mold); and
  forming the transferable refractive optical system onto the "lens mold" layer of the microstructure-bearing release liner by:
    placing the "lens mold" layer 26 of the microstructure-bearing release liner 22 against a rigid icon mold 82 (see FIG. 2A) while an optically functional UV curable liquid polymer (e.g., polyester acrylate) 84 fills the plurality of voids of both the "lens mold" layer and the rigid icon mold, applying pressure with a nip roller to exclude excess liquid polymer 84, and simultaneously exposing the liquid polymer to UV radiation such that the UV curable polymer cures or hardens and can be lifted from the icon mold (see FIG. 2B). As will be readily appreciated by those skilled in the art, the optically functional polymer must have sufficient adherence to the "lens mold" layer of the release liner to survive the process of lifting after the material is cured between the "lens mold" layer and the rigid icon mold and lifted from the icon mold. As shown in FIG. 2C, the material lifted from the rigid icon mold 82, in this exemplary embodiment, has structured image icons in the form of voids 86;

filling the plurality of image icons with a material providing a contrast with the optically functional polymer (e.g., a UV curable flexographic printing ink) to form a filled image icon layer; optionally, optionally applying one or more of a sealing layer, a stiffening layer, a pigmented or dyed layer, an opacifying layer, or combinations thereof to the filled image icon layer; and applying one or more adhesive layers (e.g., tack free thermally activated adhesive layers) to the optionally sealed, stiffened, pigmented/dyed, and/or opacified, filled image icon layer.

Once prepared, the transferable refractive optical system 20 may be handled like a traditional transfer foil, that is, the material can be wound and unwound from a roll and further converted into a suitable final shape such as a patch, thread, or sheet by converting methods common in the security printing and packaging industries. In order to transfer the synthetic image presentation system 30 from the release liner 22, the adhesive side of the system 20 is placed in contact with a desired final substrate (e.g., paper substrate 28). Heat and/or pressure is applied causing the adhesive in adhesive layer 34 to bond securely to substrate 28. Then, the release liner 22 with "lens mold" layer 26 is peeled away, leaving behind the desired synthetic image presentation system 30.

As will be readily appreciated from the above description, for reliable separation to occur using this technique, relative bond strengths must be controlled as follows:

Strongest Bond Strengths:
adhesive layer 34 to paper substrate 28
"lens mold" layer 26 to carrier substrate 24
Mid-Range Bond Strength:
cured optically functional polymer to positive lens mold
Weakest Bond Strength:
cured optically functional polymer to rigid icon mold.

While bond strengths may be higher or lower depending on the process conditions and final product requirements, the relative interfacial bond strengths must be maintained in the aforementioned way. For example, if the cured optically functional polymer bonds very aggressively to the rigid icon mold, then this sets the minimum bond strength value, and all other bonds must be adjusted higher accordingly.

Reflective System Embodiments

Figure 3:
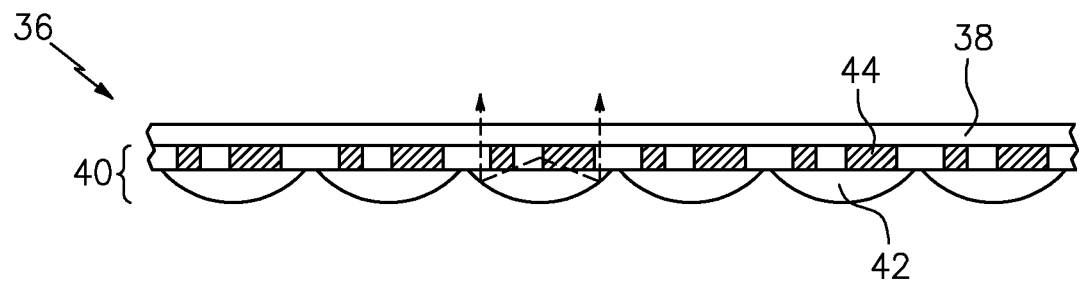
FIG. 3—concave reflective optical system.

In a third exemplary embodiment, which is best shown in FIG. 3, the inventive system is a concave reflective optical system 36 that further includes a support or carrier substrate 38. In this embodiment, a synthetic image presentation system 40 is built on one side of the carrier substrate 38.

The synthetic image presentation system 40 in this exemplary embodiment employs concave reflective focusing elements 42, which each have a focal length such that a structured image icon 44 placed substantially in contact or close to its crest or highest point intersects with a portion of its depth of focus, when viewed normal to the surface. These reflective focusing elements are coated with a reflective material to obtain high focusing efficiency. For example, the focusing elements may be conformally coated with a reflective material such as aluminum, chrome, copper, gold, nickel, silver, stainless steel, tin, titanium, zinc sulfide, magnesium fluoride, titanium dioxide, or other material providing the desired level of reflectivity. This reflective material may be applied at thicknesses ranging from about 50 nanometers to about 2 microns using physical vapor deposition (PVD), chemical vapor deposition (CVD), or other suitable process. A protective coating may then be applied to protect the reflective layer. Protective coatings may be prepared from energy curable acrylates (e.g., energy curable acrylates containing organic or inorganic fillers with pigmenting or reinforcing properties), solvent or water based coatings such as acrylics, epoxies, EVAs, polyurethanes, PVAs, and the like, and applied at thicknesses ranging from about 1 to about 10 microns.

Generally, these focusing elements have very low f-numbers, preferably, less than about 1, and more preferably, between about 0.25 and about 0.50, and cylindrical, spheric or aspheric surfaces. As noted above, f-number means the ratio of a focusing element's focal length to its effective lens diameter. For a spherical concave reflector, the focal length is equal to the radius of curvature divided by two.

For reflective focusing elements with an f number greater than about 1, the optical separation required for focusing on an image icon layer is too large to be practical without employing the use of an optical spacer. For f-numbers less than about 0.25, the focal points of the reflectors will lie within the volume of the reflector (i.e., within the region bounded by the crest and the trough of the reflector) and will be out of focus with an image icon layer formed at its base. So f-numbers between about 1 and about 0.25 are preferred for the inventive system to present focused synthetic images without the use of an optical spacer.

The synthetic image presentation system 40 may be formed against the carrier substrate 38 during formation of the structured image icons and focusing elements by the method of casting and releasing from microstructured molds using energy curable polymers. Suitable carrier substrates include those described in the first exemplary embodiment. Similarly, the arrangements of structured image icons and focusing elements of the synthetic image presentation system 40 can be formed from the materials identified above with respect to the first exemplary embodiment.

The preferred dimensions for micro-scale systems are also the same as those identified for the first exemplary embodiment. For macro-scale systems used, for example, for signage or in the form of motor vehicle decals or wraps:

(a) the focusing elements have preferred widths/base diameters ranging from about 1 to about 10 millimeters (mm), including (but not limited to) widths/base diameters ranging from about 250 microns to about 1 mm, and ranging from about 50 to about 250 microns, preferred focal lengths ranging from about 25 microns to about 5 mm (more preferably, from about 250 microns to about 1 mm), and preferred f-numbers of less than or equal to about 1 (more preferably, less than or equal to about 0.5);

(b) the structured image icons are either optionally coated and/or filled voids or recesses each preferably measuring from about 5 centimeters (cm) to about 1 micron in total depth, or raised areas or shaped posts each preferably measuring from about 5 cm to about 1 micron in total height;

(c) the carrier substrate has a preferred thickness ranging from about 25 microns to about 5 mm, more preferably, from about 250 microns to about 1 mm; and (d) the total thickness of the inventive refractive optical system is preferably less than or equal to about 1 cm including (but not limited to) thicknesses: ranging from about 250 microns to about 1 cm; ranging from about 50 to about 250 microns; and of less than about 50 microns.

Macro-scale reflective optical systems contemplated by way of the present invention may employ image icons formed using conventional printing techniques (e.g., traditional inkjet or laser printing). These systems are made up of one or more arrangements of reflective focusing elements (e.g., concave reflective, convex reflective, reflective diffractive) with dimensions as noted above (e.g., widths/base diameters ranging from about 1 to about 10 millimeters), and printed image icons substantially in contact with, but not completely embedded within, the one or more arrangements of focusing elements. The printed image icons have line widths of less than or equal to about 1 millimeter. As will be readily appreciated by those skilled in the art, when finer line widths are used, more detailed designs may be applied within the design space afforded by way of these relatively large focusing elements.

Figure 4:
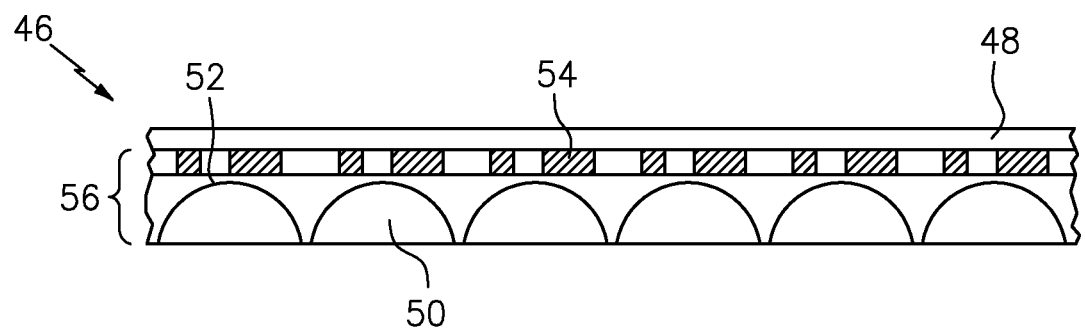
FIG. 4—convex reflective optical system.

In a fourth exemplary embodiment, which is best shown in FIG. 4, the inventive system is a convex reflective optical system 46 that further includes a support or carrier substrate 48. The surface of each convex reflective focusing element 50 is such that it "bulges out" towards the viewer. These focusing elements are "shiny" in the sense that a bright spot of light 52 appears on the surface when it is illuminated by a distant light source. The bright spot of light 52 is called a "specular highlight".

When viewing system 46 with image icons situated above the convex reflective focusing elements, the viewer will either see that the specular highlights are blocked by the image icons, or that they are not blocked by the image icons. In other words, the arrangement of convex reflective focusing elements 50 when coupled with the arrangement of structured image icons 54 will form a pattern of blocked and non-blocked specular highlights. This pattern forms a synthetic image.

Generally, these focusing elements also have very low f-numbers, preferably, less than about 1, and more preferably, between about 0.25 and about 0.50, and spheric or aspheric surfaces.

In addition to focusing elements prepared by the methods described herein (as well as in U.S. Pat. No. 7,333,268 to Steenblik et al., U.S. Pat. No. 7,468,842 to Steenblik et al., and U.S. Pat. No. 7,738,175 to Steenblik et al.), macro-scale reflective focusing elements of the convex or concave type may also constitute separate discrete structures, or may be formed by casting from these discreet structures. For example, metallic ball bearings can be grouped together into a regular close-packed arrangement onto a flat surface, forming an arrangement of convex reflectors. By placing a transparency film over the top of the ball bearing arrangement, the transparency film having an arrangement of image icons with the same packing arrangement on its surface, the arrangement of image icons having a pitch scaled with respect to the pitch of the ball bearing arrangement, then a macro-scale synthetic image presentation system may be formed.

Such a system of convex reflectors may be useful in a display or billboard installation, in which case the ball bearings (e.g., 3.18 mm diameter highly polished stainless steel) would be permanently bonded to a rigid, flat backing surface by way of, for example, an epoxy or by permanent welds. In this type of installation, image icons can be printed by traditional inkjet or laser printing (e.g., by large format inkjet billboard printing equipment) onto a suitable transparent, printable film or plastic sheeting (e.g., heavy gauge transparent billboard vinyl) and overlaid against the ball bearings with printed side facing the ball bearing arrangement. The printed arrangement may be secured against the ball bearings by way of a frame, or the printing may be covered by a semipermanent adhesive and then adhered to the arrangement of ball bearings. The printed overlay could then be removed and replaced as needed with new graphics as is typical with traditional billboard installations.

In order to reduce the cost and weight of using the discreet reflective elements in the final display, an alternative approach is first to form one permanent arrangement of discreet convex reflective elements, as described above. Focal distance may then be tailored by filling the interstitial spaces of the arrangement to the desired level with an epoxy or mold release agent, and subsequently casting a polymer replica from this arrangement. By using techniques known in the art of macro-scale mold forming (e.g., vacuum forming, heat molding, resin casting, etc.), a rigid sheet having concave lens geometry may be formed and removed from the permanent mold. Once removed, the rigid sheet may be metalized with a reflective coating (e.g., by physical vapor deposition, solution deposition, electroplating, etc.) and is then ready for installation as a concave reflective synthetic image presentation system. By placing a printed graphic arrangement (as described above) in contact with the reflector arrangement, synthetic images may be formed, resulting in a large format display system.

The dimensions of these arrangements may be modified as necessary depending on the required viewing distance. For example, a viewing distance of approximately 90 meters is estimated to require an individual reflector diameter of from about 8 mm to about 1 cm.

Similar to the previously described system embodiments, synthetic image presentation system 56 may be cast against carrier substrate 48, with the materials used and the system dimensions the same as those identified for the third exemplary embodiment.

Figure 5:
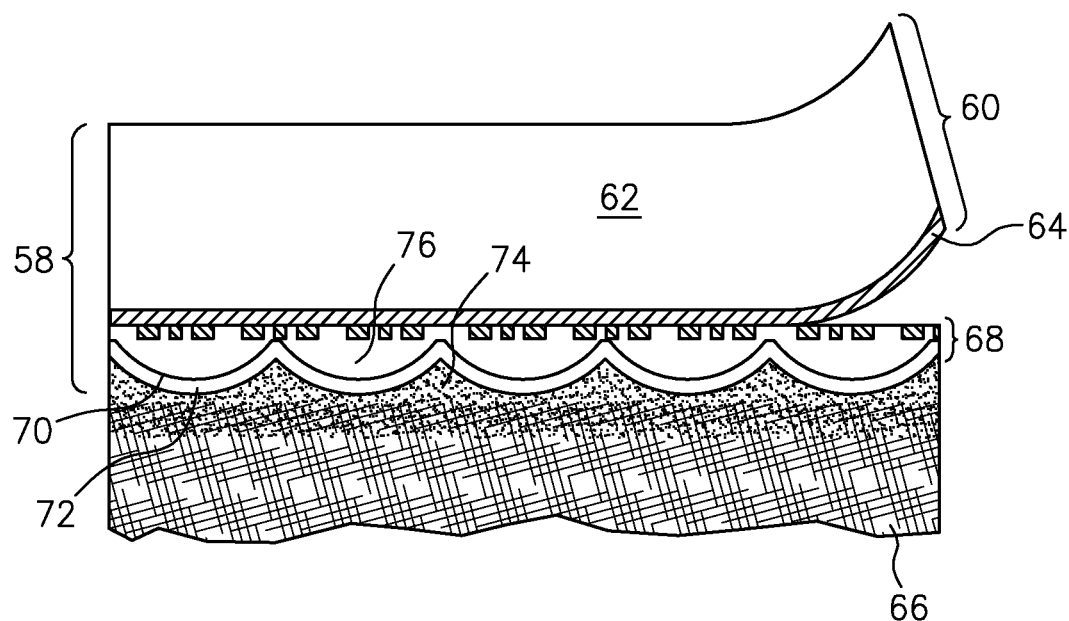
FIG. 5—transferable concave reflective optical system.

In a fifth exemplary embodiment, which is best shown in FIG. 5, the inventive system is a transferable concave reflective optical system 58 that further includes, among other layers, a release liner 60, which is made up of carrier substrate 62 and release coating 64. While FIG. 5 relates to a transferable concave reflective optical system, the above described convex reflective optical system is also transferable.

FIG. 5 shows the system 58 during application to a paper substrate 66, with synthetic image presentation system 68 releasably coupled to release liner 60. Typically, release coating 64 is a functional release coating, applied at a thickness of between 1 and 10 microns that allows bonding at ambient conditions and then release at the time of transfer using mechanical, chemical, thermal and photo-induced separation techniques. For example, when a heat and pressure activated release is desired, the carrier substrate 62 (e.g., a UV transmissive PET film layer with a thickness between 15 and 50 microns) would contain a coating that has good adhesion at ambient temperature, but softens and releases with the application of heat and pressure at the time of lamination in, for example, a desktop document laminator, or on an industrial foiling machine, which apply heat and pressure in a continuous web process. Examples of suitable functional release coatings include, but are not limited to, low surface energy materials such as polyethylene, polypropylene, silicone, or hydrocarbon waxes. Also suitable are pressure sensitive adhesives whose bond strengths weaken considerably at elevated temperatures, formulated with tackifying resins and monomers with the appropriate glass transition temperature (Tg), to provide release at the desired temperature.

A reflective layer (e.g., a vapor deposited metal layer) 70, optional protective coating 72, and adhesive layer 74, are shown on the arrangement of focusing elements 76. The reflective layer is a conformally coated reflective layer prepared using aluminum, chrome, copper, gold, nickel, silver, stainless steel, tin, titanium, zinc sulfide, magnesium fluoride, titanium dioxide, or other material providing the desired level of reflectivity. This layer may be applied at thicknesses ranging from about 50 nanometers to about 2 microns using physical vapor deposition (PVD), chemical vapor deposition (CVD), or other suitable process. Optional protective coating 72, which serves to protect the reflective layer, may be prepared from energy curable acrylates (e.g., energy curable acrylates containing organic or inorganic fillers with pigmenting or reinforcing properties), solvent or water based coatings such as acrylics, epoxies, EVAs, polyurethanes, PVAs, and the like, and is applied at thicknesses ranging from about 1 to about 10 microns, while the adhesive layer may be prepared from thermally activated adhesives (i.e., hot melt or heat seal adhesives), pressure sensitive adhesives, or any thermoset or thermoplastic adhesive system selected to provide bonding between these target surfaces including acrylics, cyanoacrylates, epoxies, polyimides, polyurethanes, polyvinyl acetates, rubber, and silicones, is preferably prepared from a tack free thermally activated adhesive (e.g., water-based polyurethane), and is applied at thicknesses ranging from about 1 to about 10 microns.

An exemplary method of manufacturing the transferable reflective optical system of the present invention comprises:
  applying a curable resin material to a surface of a release liner (e.g., a smooth or non-structured carrier substrate having a functional release coating) and curing the surface against a rigid icon mold to form one or more arrangements of image icons in the form of voids within a surface of the curable resin material;
  filling the voids with a material providing a contrast with the curable resin material to form a filled image icon layer;
  applying a curable resin material to a surface of the filled image icon layer and curing the resin against a rigid surface having negative lens geometries (i.e., a negative lens mold) forming one or more arrangements of focusing elements on a surface of the curable resin material;
  applying a conformal coating of metal or other reflective material to the focusing elements to form one or more arrangements of reflective focusing elements; optionally, applying one or more protective coating layers to the one or more arrangements of reflective focusing elements; and
  applying one or more adhesive layers (e.g., tack free thermally activated adhesive layers) to the one or more optionally protective coated arrangements of reflective focusing elements.

The resulting film-like structure can be handled/converted/transferred like a traditional transfer film. In other words, the structure may be brought into contact with a target substrate (e.g., currency paper, ID document, or product packaging), and upon the application of heat and pressure, the release liner can be completely peeled away, leaving only the synthetic image presentation system on the final substrate.

An example of a continuous transfer process for transferring the inventive system to a target substrate employs a hot stamping machine available from Leonard Kurz Stiftung & Co. KG (model number MHA 840). In this process, the system in the form of up to six film-like structures are placed in register (in cross direction (CD)) on a base paper, counter wheel pairs on the hot stamping machine apply pressure (550 Newtons (N)/wheel) to the film-like structures, which causes activation of the tack free thermally activated adhesive layers. The release liners are then separated from the underlying structures and rewound on common cylinders. Typical machine settings are: speed (100-120 meters/minute), temperature (135-160° C.).

Generally speaking, in order for the reflective system to reliably transfer to a final substrate (e.g., paper), the adhesive bond strength between the substrate and the reflective system must be greater than the bond which holds the reflective system to the release liner. Typical bond strengths for such an arrangement may be in the range of 10 to 100 Newtons per square inch ($N/in^2$) for the bond between the reflective system and substrate, and in the range of 0.1 to 10 $N/in^2$ for the bond between the reflective system and release liner.

Diffractive System Embodiments

In a sixth exemplary embodiment, the inventive system is an optionally transferable diffractive optical system. Diffractive focusing elements also provide for convergence of incident light and systems made using these focusing elements are thinner than the above described refractive and reflective systems with comparable f-numbers, with total diffractive optical system thicknesses ranging from about 3 to about 50 microns (preferably, from about 5 to about 10 microns).

The inventive diffractive optical system employs diffractive focusing elements made using the same materials identified for the focusing elements used in the above described refractive and reflective systems. These diffractive focusing elements have preferred widths/base diameters of less than about 100 microns (more preferably, less than about 75 microns, and most preferably, from about 15 to about 50 microns).

These diffractive focusing elements are selected from the group of diffractive Fresnel lenses, Fresnel zone plate lenses, and hybrid refractive/diffractive lenses, and combinations thereof. In an exemplary embodiment, diffractive Fresnel lenses are used, each such lens having a series of concentric annular rings with a common focus. The concentric rings lie in a common plane making each lens extremely flat compared to refractive lenses with similar f-numbers. The successive rings may have continuous curvature for maximum efficiency or the curvature may be approximated by any number of steps or phase levels. The simplest diffractive Fresnel lens approximation has only two steps and is known as a Fresnel Zone Plate or Binary Fresnel Lens. More complex approximations, in increased order of complexity, are quaternary, eight levels, sixteen levels, and analog. In a preferred embodiment, the diffractive Fresnel lens is an analog profile lens.

The structured image icons used in the inventive diffractive optical system are similar to those used in the above described refractive and reflective systems.

Figure 6:
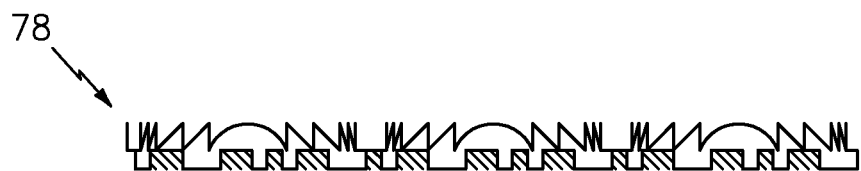
FIG. 6—diffractive optical system employing transmissive Fresnel lenses.
Figure 7:
FIG. 7—diffractive optical system employing reflective Fresnel lenses.

Diffractive focusing elements are known to be sensitive to wavelength changes and suffer from high chromatic aberration. In the inventive system, however, the diffractive focusing elements may be either transmissive (see diffractive optical system 78 in FIG. 6) or reflective (see diffractive optical system 80 in FIG. 7). In either system, the structured image icons intersect with the depth of focus of an associated diffractive focusing element (e.g., Fresnel lens), which is accomplished without the use of an optical spacer.

The optionally transferable transmissive diffractive optical system 78 is produced using the same method and material construction as the first exemplary embodiment, except that the geometry of the refractive lens mold is replaced with a geometry suitable for producing a diffractive lens. This optical system can also be transferred from its carrier substrate using the technique detailed in the second exemplary embodiment.

The optionally transferable reflective mode diffractive optical system 80 is produced using the same method and material construction as the third exemplary embodiment, except that the geometry of the reflective lens mold is replaced with a geometry suitable for producing a reflective style of diffractive lens, which is subsequently metalized. This optical system can likewise be transferred from its carrier substrate using the technique for reflective transfer detailed in the fifth exemplary embodiment.

The present invention further provides fibrous and non-fibrous sheet materials that are made from or employ the inventive system, as well as documents made from these materials. The term "documents", as used herein designates documents of any kind having financial value, such as banknotes or currency, bonds, checks, traveler's checks, lottery tickets, postage stamps, stock certificates, title deeds and the like, or identity documents, such as passports, ID cards, driving licenses and the like, or non-secure documents, such as labels. The inventive optical system is also contemplated for use with goods (consumer or non-consumer goods) as well as bags, packaging, or labels used with these goods.

Other contemplated end-use applications for the inventive system include products for projecting larger dimension images such as advertising and multimedia displays (e.g., billboards, traffic and industrial safety signs, commercial displays for marketing or tradeshow purposes), products for enhancing a vehicle's appearance (e.g., decal, wrap), decorative wrap and wallpaper, shower curtains, artistic displays, and the like.

Other features and advantages of the invention will be apparent to one of ordinary skill from the following detailed description and accompanying drawings. Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

What is claimed is:

1. An optical system, which comprises a synthetic image presentation system made up of an arrangement of structured image icons substantially in contact with, but not completely embedded within, an arrangement of focusing elements, wherein the arrangement of focusing elements that is substantially in contact with the arrangement of structured image icons focuses on the arrangement of structured image icons that is substantially in contact with the arrangement of focusing elements and projects at least one synthetically magnified image of at least a portion of structured image icons of the arrangement of structured image icons, the arrangement of focusing elements comprising interstitial space between focusing elements, wherein the interstitial space between focusing elements in the arrangement of focusing elements does not contribute to forming the at least one synthetically magnified image, wherein focal points of the focusing elements lie on or within the arrangement of structured image icons, and wherein the optical system is a spacerless optical system.

2. The optical system of claim 1, wherein structured image icons of the arrangement of structured image icons comprise voids in a substantially planar structure, wherein the voids are filled or coated with another material; raised areas in a substantially planar structure; or combinations thereof.

3. The optical system of claim 1, wherein a thickness of the optical system is less than 50 microns, and wherein the interstitial space between the focusing elements in the arrangement of focusing elements is about 5 microns or less.

4. The optical system of claim 1, wherein a thickness of the optical system is less than or equal to about 1 centimeter, and wherein the interstitial space between the focusing elements in the arrangement of focusing elements is about 5 millimeters or less.

5. The optical system of claim 1, which is a refractive optical system.

6. The optical system of claim 5, wherein the focusing elements in the arrangement of focusing elements have f-numbers of less than or equal to 1 and cylindrical, spheric or aspheric surfaces.

7. The optical system of claim 5, wherein the optical system is a micro-scale system formed on a carrier substrate, wherein the focusing elements have base diameters and focal lengths of less than about 50 microns, and f-numbers of less than or equal to 1, wherein structured image icons of the arrangement of structured image icons are formed from one or more of: filled or coated voids measuring from about 50 nanometers to about 8 microns in total depth; and raised areas measuring from about 50 nanometers to about 8 microns in total height, wherein the micro-scale system has a thickness of less than about 50 microns, and wherein the carrier substrate has a thickness ranging from about 10 to about 50 microns.

8. The optical system of claim 5, wherein the optical system is a transferable refractive optical system that comprises the following layers in the order specified:
a microstructure-bearing release liner, which is made up of a carrier substrate and a lens mold layer, wherein the lens mold layer has a plurality of voids with negative lens geometries;
the refractive optical system, wherein the focusing elements of the arrangement of focusing elements have positive lens geometries, and are in intimate contact with the lens mold layer of the microstructure-bearing release liner;
one or more layers comprising at least one of a stiffening layer, a sealing layer, a pigmented or dyed layer, or an opacifying layer; and
one or more activatable adhesive layers,
wherein, the refractive optical system has a higher stiffness or resistance to bending than the microstructure-bearing release liner.

9. The transferable refractive optical system of claim 8, wherein the stiffening layer is prepared from energy curable acrylates and has a thickness between about 1 and about 10 microns.

10. A method of manufacturing the refractive optical system of claim 5, wherein the optical system is a transferable refractive optical system, which method comprises:
forming a microstructure-bearing release liner comprising a lens mold layer adhered to a carrier film, wherein the lens mold layer is formed from a curable resin having a plurality of voids with negative lens geometries, the negative lens geometries being made by curing the curable resin against a rigid surface having positive lens geometries; and forming the transferable refractive optical system onto the lens mold layer of the microstructure-bearing release liner by:

placing the lens mold layer of the microstructure-bearing release liner against a rigid icon mold while an optically functional, radiation curable liquid polymer fills voids in both the lens mold layer and the rigid icon mold, applying pressure with a nip roller to exclude excess liquid polymer, and simultaneously exposing the radiation curable liquid polymer to radiation such that the radiation curable liquid polymer cures or hardens and can be lifted from the rigid icon mold, wherein the cured or hardened polymer has structured image icons formed from voids in an outer surface thereof;

filling the structured image icons formed from voids with a material providing a contrast with radiation curable polymer to form a filled image icon layer;

applying one or more of a sealing layer, a stiffening layer, a pigmented or dyed layer, or an opacifying layer to the filled image icon layer; and applying one or more adhesive layers to the filled image icon layer.

11. The optical system of claim 1, which is a reflective optical system.

12. The optical system of claim 11, wherein the arrangement of focusing elements are provided with one or more layers comprising at least one of a fully opaque reflecting metal layer, a semitransparent or partially metalized metal layer, a high refractive index layer, and multiple layers of vapor deposited material.

13. The optical system of claim 12, wherein the arrangements of focusing elements are provided with multiple layers of vapor deposited material, the multiple layers of vapor deposited material comprising color-shifting interference coatings formed from a combination of metal and dielectric layers.

14. The optical system of claim 11, wherein the optical system is a concave reflective system that is formed on a carrier substrate.

15. The optical system of claim 14, wherein the concave reflective system is a concave reflective micro-scale system, comprising concave reflective focusing elements with base diameters and focal lengths of less than about 50 microns, and f-numbers of less than or equal to 1, wherein structured image icons of the arrangement of structured image icons are formed from one or more of: filled or coated voids measuring from about 50 nanometers to about 8 microns in total depth; and raised areas measuring from about 50 nanometers to about 8 microns in total height, wherein the optical system has a thickness of less than about 50 microns, and wherein the carrier substrate has a thickness ranging from about 10 to about 50 microns.

16. The optical system of claim 14, wherein the concave reflective system is a concave reflective macro-scale system, comprising concave reflective focusing elements with base diameters ranging from about 1 to about 10 millimeters, focal lengths ranging from about 25 microns to about 5 millimeters, and f-numbers of less than or equal to 1, wherein structured image icons of the arrangement of structured image icons are formed from: voids measuring from about 5 centimeters to about 1 micron in total depth; raised areas measuring from about 5 centimeters to about 1 micron in total height; or both, wherein the optical system has a thickness of less than or equal to about 1 centimeter, and wherein the carrier substrate has a thickness ranging from about 25 microns to about 5 millimeters.

17. The optical system of claim 11, wherein the optical system is a convex reflective system that is formed on a carrier substrate, wherein a surface of each convex reflective focusing element is shiny in that a bright spot of light or specular highlight appears on the surface of each convex reflective focusing element when it is illuminated by a distant light source.

18. The optical system of claim 17, comprising an arrangement of convex reflective focusing elements, which when coupled with the arrangement of structured image icons, form a pattern of blocked and non-blocked specular highlights, wherein the pattern of blocked and non-blocked specular highlights project a synthetic image.

19. The optical system of claim 17, wherein the convex reflective system is a convex reflective macro-scale system, comprising one or more arrangements of convex reflective focusing elements is a regular close-packed arrangement of metallic ball bearings.

20. The optical system of claim 11, wherein the optical system is a transferable concave reflective optical system that comprises the following layers in the order specified:

a release liner, which is made up of a carrier substrate and a release coating;

the optical system, wherein the arrangement of structured image icons is in contact with the release coating of the release liner;

one or more protective coatings; and one or more activatable adhesive layers.

21. A method of manufacturing the reflective optical system of claim 11, wherein the optical system is a transferable reflective optical system, the method comprising:

providing a release liner, which is made up of a carrier substrate and a release coating;

applying a curable resin material to a surface of the release coating of the release liner and curing the surface against a rigid icon mold to form one or more arrangements of image icons comprising voids within a surface of the curable resin material;

filling the voids with a material providing a contrast with the curable resin material to form a filled image icon layer;

applying a curable resin material to a surface of the filled image icon layer and curing the curable resin material against a rigid surface having negative lens geometries forming one or more arrangements of reflective focusing elements on a surface of the curable resin material;

applying a conformal coating of metal or other reflective material to the focusing elements to form one or more arrangements of reflective focusing elements;

applying one or more protective coating layers to the one or more arrangements of reflective focusing elements; and applying one or more adhesive layers to the one or more arrangements of reflective focusing elements.

22. The optical system of claim 1, which is a diffractive optical system.

23. An optical system transferred to a surface, the optical system comprising an arrangement of structured image icons substantially in contact with, but not completely embedded within, an arrangement of focusing elements, and one or more functional layers comprising at least one of a stiffening layer, a sealing layer, a pigmented or dyed layer, an opacifying layer, an activatable adhesive layer, or combinations thereof, wherein the arrangement of focusing elements substantially in contact with the arrangement of structured image icons focuses on the arrangement of structured image icons which is substantially in contact with the arrangement of focusing elements, and projects at least one synthetically magnified image of at least a portion of structured image icons of the arrangement of structured image icons, wherein focal points of focusing elements of the arrangement of focusing elements lie on or within the arrangement of structured image icons, and wherein the optical system is a spacerless optical system.

24. A sheet material having opposing surfaces and comprising at least one optical system of claim 1 that is one or more of mounted on, partially embedded within, or embedded within, a surface of the sheet material.

25. A sheet material having opposing surfaces and comprising at least one optical system of claim 23 transferred to one of its opposing surfaces.

26. A document prepared from the sheet material of claim 24.

27. A document prepared from the sheet material of claim 25.

28. A consumer or non-consumer good comprising the optical system of claim 1 that is either (a) mounted on, or embedded within, a surface of the consumer or non-consumer good, or bags, packaging, or labels used with the consumer or non-consumer good, or (b) partially embedded within the consumer or non-consumer good, or bags, packaging, or labels used with the consumer or non-consumer good.

29. A consumer or non-consumer good having a surface, which has at least one optical system of claim 23 transferred to its surface, or to a surface of bags, packaging, or labels used with the consumer or non-consumer good.

30. A product for projecting large dimension images that comprises at least one optical system of claim 1 mounted on, or embedded within, a surface thereof, wherein the product comprises at least one of an advertising and multimedia display, a product for enhancing a vehicle's appearance, a decorative wrap, a wallpaper, a shower curtain, and an artistic display.

31. A product for projecting large dimension images that comprises at least one optical system of claim 23 transferred to a surface thereof, wherein the product comprises at least one of an advertising or multimedia display, a product for enhancing a vehicle's appearance, a decorative wrap, a wallpaper, a shower curtain, and an artistic display.

32. A macro-scale reflective optical system, which comprises an arrangement of reflective focusing elements having widths/base diameters ranging from about 1 to about 10 millimeters, and printed image icons substantially in contact with, but not completely embedded within, the arrangement of reflective focusing elements, the printed image icons having line widths of less than or equal to about 1 millimeter, wherein the arrangement of reflective focusing elements that is substantially in contact with the printed image icons focuses on the printed image icons that are substantially in contact with the arrangement of reflective focusing elements and projects at least one synthetically magnified image of at least a portion of the printed image icons, wherein focal points of focusing elements of the arrangement of reflective focusing elements lie on or within the printed image icons, and wherein the macro-scale reflective optical system is a spacerless optical system.

33. The macro-scale reflective optical system of claim 32, wherein the arrangement of reflective focusing elements have focal lengths ranging from about 25 microns to about 5 millimeters, and f numbers of less than or equal to about 1.

34. The macro-scale reflective optical system of claim 32, wherein the arrangement of reflective focusing elements comprises at least one of a concave reflective focusing element, a convex reflective focusing element, a reflective diffractive focusing element, and combinations thereof.

* * * * *